Dec. 5, 1933.  A. M. REMINGTON  1,938,439
MACHINE FOR CIRCULAR GRINDING
Filed June 1, 1931
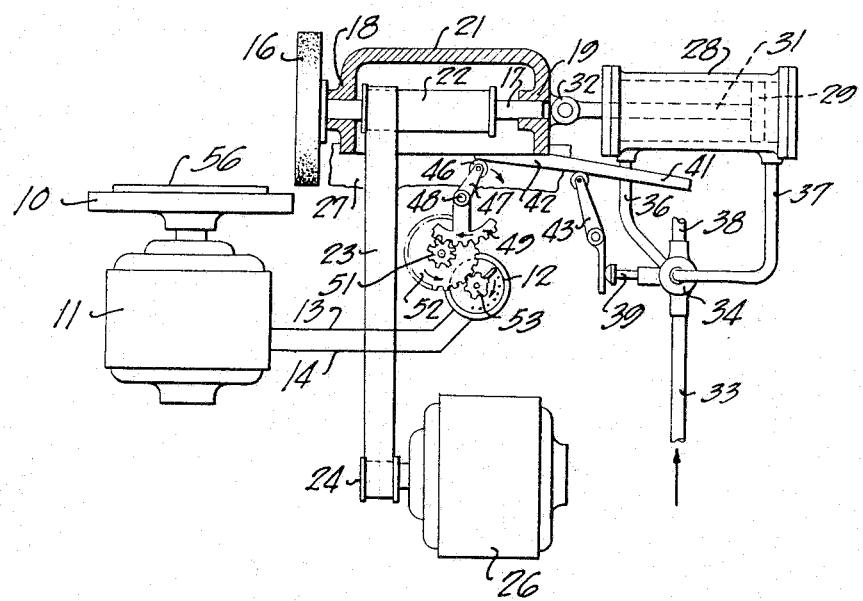
INVENTOR
Alfred M. Remington
by Roberts, Cushman & Woodberry
ATTYS Patented Dec. 5, 1933

1,938,439

UNITED STATES PATENT OFFICE 1,938,439

MACHINE FOR CIRCULAR GRINDING

Alfred M. Remington, Fitchburg, Mass., assignor to Simonds Saw and Steel Company, Fitchburg, Mass., a corporation of Massachusetts Application June 1, 1931. Serial No. 541,152

5 Claims. (Cl. 51—50)

This invention relates to the art of machining or grinding a surface disposed transversely of a rotating piece of stock as well as to apparatus for these purposes.

It is customary to perform operations of this character by causing a tool to travel transversely of the stock at a substantially uniform or unvarying velocity. In so moving, the trace of the tool over the stock follows the course of a spiral and the continuously changing relative speed of the stock and tool causes the tool to become less effective as the axis of rotation is approached. Tools suitable for these purposes have optimum speeds at which they operate with best efficiency and also limiting speeds beyond which satisfactory performance may not be expected.

To avoid exceeding the maximum speed for the tool these operations are frequently conducted by rotating the stock at a speed which produces the maximum permissible relative speed at the greatest diameter, but when this is done the tool operates at its optimum speed only through a relatively small portion of its travel with the result that the cutting efficiency of the tool is reduced as the axis of rotation is approached. As a reasult of these conditions it has heretofore often been necessary to take lighter cuts throughout the major portion of the travel of the tool than those which the tool is capable of taking at its optimum speeds, and hence the full efficiency of the tool is not obtained and frequently the time required for the operation is considerably increased. Difficulties of this kind become even greater when the tool employed is of the rotary driven type such as a grinding wheel.

For example, in facing circular saws the saw is mounted on a turntable and a rotating grinder is moved back and forth radially of the saw. If the turntable and the grinder rotate at constant speed and the grinder is moved back and forth between the periphery and center of the saw at uniform linear velocity, the rate of grinding near the center of the saw is much less than near the periphery for the reason that the center is moving at a much lower linear velocity. Heretofore it has been customary to adjust the rate of rotation to obtain maximum efficiency near the periphery of the saw where the relative movement between grinder and saw is maximum and consequently the efficiency near the center has been comparatively low.

Objects of this invention are to overcome difficulties of the character referred to by maintaining the speed of the stock relative to the effective portion of the tool substantially constant at the optimum speed for the latter; to provide for simultaneously varying the rotational speed of the stock and the speed of travel of the tool to produce a substantially constant relative speed corresponding to the optimum speed for the tool; to provide simple and efficient apparatus for these purposes; and also to provide apparatus of the class described having an improved construction and relative arrangement of parts.

In the application of the present invention to the aforesaid grinding of saws for example, the rotation of the turntable is accelerated as the grinder progresses toward the center of the saw and decelerated as the grinder returns toward the periphery, thereby to maintain the relative linear velocity between saw and grinder, due to their rotation, approximately constant. If the progression of the grinder radially of the saw were maintained constant as heretofore this variation in the angular velocity of the saw would result in a decrease in the pitch of the feed of the grinder relatively to the saw (that is a decrease in the distance the grinder progresses radially of the saw per revolution of the saw) as the grinder advances toward the center of the saw, resulting in a progressive decrease in width of cut per saw revolution and a consequent variation in efficiency. Consequently I propose to vary the rate of feed of the grinder radially of the saw at a rate corresponding to the variation in angular velocity of the saw, thereby to maintain approximately constant the pitch or width of cut as well as the aforesaid relative linear velocity of the saw and grinder. By simultaneously making these two variations in speed, namely the speed of rotation of the turntable and the rate of feed or reciprocation of the grinder radially of the saw, a saw can be ground in a small fraction of the time required by the old method where the rate of rotation of the turntable was constant and the rate of feed of the grinder was also constant.

The single figure of the drawing is a side elevation of grinding apparatus, some of the parts being omitted and others broken away.

In the apparatus selected for illustration a rotary work supporting table 10 is connected to the armature shaft of a driving motor 11. A rheostat 12 is connected by the conductors 13 and 14 to the field circuit of the motor to provide a variable resistance for controlling the motor speed.

A grinding wheel 16 is mounted upon a shaft 17 which is rotatably supported in spaced bearings 18 and 19 formed in a reciprocable head 21. Intermediate the bearings 18 and 19 a relatively wide pulley 22 is secured to the shaft 17, and a belt 23 is trained over this pulley and over the driving pulley 24 of a motor 26.

The head 21 is mounted to reciprocate on a supporting member 27, being guided along this support in any approved manner so as to cause the grinding wheel to move transversely across the upper surface of the work table 10, preferably substantially along a radius of this work table. A power cylinder 28 is disposed adjacent the head and fitted with a piston 29 having its rod 31 secured to the head 21 by connecting means indicated generally at 32. Pressure fluid for operating the piston 29 is supplied through a pipe 33 to a control valve 34 from which pipes 36 and 37 lead to ports at opposite ends of the cylinder. The control valve also has the usual discharge connection 38 and is generally of a construction well known in the art. The delivery of pressure fluid from this valve to the cylinder is arranged to be controlled by a plunger 39 slidably mounted in the valve casing. This plunger normally is pressed inwardly as by means of a spring (not shown) to permit full flow of pressure fluid delivered through the connection 33 alternately to the connections 36 and 37.

The reciprocable head 21 carries a cam member 41 having a downwardly inclined cam surface 42. A lever 43 is mounted to pivot intermediate its ends in a position to have the lower end thereof bear against the head of the plunger 39, while the upper end of this lever carries a roller positioned to bear against the inclined cam surface 42. Another roller 46 is carried by an arm 47 arranged in position to hold the roller against the cam surface 42. This arm is mounted upon a rotatable shaft 48 which carries a gear-sector 49, the latter meshing with a pinion 51 which is fast to a large gear 52. The rheostat 12 is equipped with a pinion 53 meshing with the large gear 52 and this pinion is adapted upon rotation to vary the resistance in field circuit of the motor.

In operation, fluid such as oil is delivered under pressure to the conduit 33 from which it is directed by the control valve alternately to opposite ends of the cylinder for operating the piston and in this manner causing the head 21 to reciprocate and carry the grinding wheel 16 transversely across the surface of a piece of stock 56 mounted upon the work table.

The motor 26 is also operated to transmit power through the belt 23 and the pulley 22 to the grinding wheel for rotating the latter. As the head reciprocates, the belt is adapted to traverse the widened face of the pulley 22. The motor 11 is also operated to set the work table and the stock 56 in rotation. As the rotating grinding wheel 16 is advanced across a surface of the rotating piece of stock 56 the inclined surface 42 of the cam 41 becomes effective to move the arm 47 progressively in a clockwise direction and at the same time to move the lever 43 progressively and continuously in a counter-clockwise direction. This movement of the arm 47 is effective through the gearing substantially continuously and progressively to vary the resistance in the motor field circuit and thus to increase the speed of the motor as the grinding wheel moves inwardly or toward the axis of rotation of the piece of stock. Concurrently with this action movement of the lever 43 is effective continuously and progressively to depress the plunger 39 so as to increase the delivery of pressure fluid through the conduit 37. This progressively increases the speed of travel of the grinding wheel 16 as the latter approaches the axis of rotation of the stock being machined. On the return stroke the lever 43 is actuated in the reverse order progressively to reduce the flow of motive fluid by means of the plunger 39 so as to reduce the speed of travel as the grinding wheel 16 moves outwardly or away from the axis of rotation of the piece of stock. Likewise the arm 47 is effective through the gearing for rotating the gear 53 in a direction opposite to that in which it has just been moved and in this way to vary the resistance in the field circuit so as to decrease the speed of the motor and the rotational speed of the stock.

It will be understood that the cam 41 and the means operated thereby are so arranged as to maintain the speed of the stock relative to the tool at the points of engagement substantially constant at the optimum speed for the particular tool employed. As the tool 16 is driven at a substantially constant speed, it will be evident that the features of this invention apply also to a tool of the non-rotatable type. While with some tools under certain conditions of operation, it is possible considerably to improve the cutting efficiency and in many cases to approximate at least, if not to maintain the optimum speed merely by varying either the rotational speed of the stock or the speed of travel of the tool, it is preferred to control both of these factors concurrently, as a large class of operations may be improved by following the latter mode of procedure. Moreover, as the speed of travel of the tool and also the rotational speed of the stock is controlled by the position of the cam 41, it will be seen that these speeds are in effect controlled in response to the actual location or position of the tool 16 with respect to the axis of rotation of the stock.

It should be understood that the present disclosure is for the purpose of illustration only and that this invention includes all modifications and equivalents which fall within the scope of the appended claims.

I claim:

1. Apparatus of the class described comprising a rotatable work support, means for supporting a tool for movement transversely of the work support, operating means for rotating the work support and for causing the tool to travel transversely thereof, a cam movable with the tool during travel thereof, and a plurality of control means operable by the cam, one of said control means being effective for substantially continuously and concurrently varying the rotational speed of the work support and the other of said control means being effective for substantially continuously and concurrently varying the speed of travel of the tool to maintain the relative speed of stock carried by the work support and the tool at points of engagement therebetween substantially constant at the optimum speed for the tool.

2. Apparatus of the class described comprising a rotatable work support, a tool, means for supporting the tool for movement transversely of the work support, operating means for rotating the work support, a power cylinder for causing the tool to travel transversely of the work support, means responsive to travel of the tool for varying the delivery of pressure fluid to the power cylinder, and other means for concurrently varying the speed of the operating means for the work support, whereby the speed of stock carried by the work support relative to the tool at points of engagement may be maintained substantially constant at the optimum speed for the tool.

3. Apparatus of the class described comprising a rotatable work support, a tool, means for supporting the tool for movement transversely of the work support, operating means for rotating the work support, a power cylinder for causing the tool to travel transversely of the work support, a cam, means responsive to travel of the tool for moving the cam, and control means operable by the cam for substantially continuously and concurrently varying the speed of the operating means and also the delivery of pressure fluid to the power cylinder, whereby the speed of stock carried by the work support relative to the tool at points of engagement therebetween may be maintained substantially constant at the optimum speed for the tool.

4. Apparatus of the class described comprising a rotatable work support, a tool, means for supporting the tool for movement transversely of the work support, operating means for rotating the work support, a power cylinder for causing the tool to travel transversely of the work support, a cam, control members engageable with the cam and operable thereby concurrently for varying the rate of flow of pressure fluid to the power cylinder and for varying the speed of said work support, and means responsive to travel of the tool for effecting relative movement of the cam and the control members for actuating the latter.

5. Apparatus of the class described comprising a rotary work support, a motor for operating said work support, a variable resistance for controlling the speed of said motor, a tool, means for reciprocating said tool transversely of the work support, a cam, a control member engageable therewith and operable thereby for varying said resistance, and means responsive to movement of said tool for effecting relative movement of said cam and said control member and thereby varying the speed of the work support.

ALFRED M. REMINGTON.